US007212473B2

(12) United States Patent
Seo et al.

(10) Patent No.: US 7,212,473 B2
(45) Date of Patent: May 1, 2007

(54) METHOD AND DEVICE FOR ADJUSTING FOCUS BIAS IN OPTICAL DISC APPARATUS

(75) Inventors: Seong Hwan Seo, Kyunggi-do (KR); Dong Sik Kim, Seoul (KR); Kyung Soo Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 511 days.

(21) Appl. No.: 10/682,040

(22) Filed: Oct. 10, 2003

(65) Prior Publication Data

US 2004/0076092 A1 Apr. 22, 2004

(30) Foreign Application Priority Data

Oct. 10, 2002 (KR) ............... 10-2002-0061904

(51) Int. Cl.
*G11B 7/00* (2006.01)
(52) U.S. Cl. ............... 369/44.29; 369/53.28; 369/44.25
(58) Field of Classification Search ............... None
See application file for complete search history.

(56) References Cited

U.S. PATENT DOCUMENTS

| 4,707,648 | A | * | 11/1987 | Minami ............... 318/640 |
| 5,218,588 | A | * | 6/1993 | Suzuki ............... 369/44.27 |
| 5,612,939 | A | * | 3/1997 | Ueki et al. ............... 369/47.11 |
| 5,627,807 | A | * | 5/1997 | Abe ............... 369/44.29 |
| 5,808,983 | A | * | 9/1998 | Tsutsui et al. ............... 369/44.29 |
| 2002/0110057 | A1 | * | 8/2002 | Kadlec et al. ............... 369/44.29 |

* cited by examiner

*Primary Examiner*—William Korzuch
*Assistant Examiner*—Christopher Lamb
(74) *Attorney, Agent, or Firm*—Birch Stewart Kolasch & Birch, LLP

(57) ABSTRACT

A method and device are provided for adjusting a focus bias of an objective lens of an optical pickup for an optical disc using a level of a tracking error signal. The level of the tracking error signal outputted when the optical disc is rotated and driven is detected for a predetermined period of time. An operation of adjusting the focus bias of the objective lens is carried out on the basis of the detected level of the tracking error signal. A focus bias adjustment value is set as an optimum focus bias value at a time when the detected level of the tracking error signal is maximized. In accordance with the method, a period of time for adjusting the focus bias is very short, on the order of "0" to several hundred milliseconds, in comparison with periods of time for adjusting the focus bias in conventional methods, such that the focus bias can be quickly adjusted. Moreover, the method moves the objective lens to an optimum focus point where the thickness of a substrate in the optical disc is thinner or thicker than the standard thickness (e.g., 0.6 mm in the case of a DVD (Digital Versatile Disc)), thereby enabling a normal playback operation.

20 Claims, 5 Drawing Sheets

METHOD AND DEVICE FOR ADJUSTING FOCUS BIAS IN OPTICAL DISC APPARATUS

This Nonprovisional application claims priority under 35 U.S.C. § 119(a) on Patent Application No(s). 2002-0061904 filed in Korea on Oct. 10, 2002, the entire contents of which are hereby incorporated by reference.

BACKGROUND OF THE INVENTION

1. Field of the Invention

The present invention relates to a method and device for adjusting a focus bias of an objective lens for an optical disc on the basis of a level of a tracking error signal detected when the optical disc is driven.

2. Description of the Related Art

Conventionally, where the thickness of a substrate of an optical disc is thinner or thicker than the standard thickness, a high-frequency playback signal on a focus error zero point is weakened, a level of a tracking error signal is abruptly degraded, and the amount of jitter of the high-frequency playback signal is abruptly increased, when a general focus point, on the optical disc, of an objective lens (focus lens) arranged within an optical pickup, is not correct. Accordingly, it is necessary that the focus bias must be adjusted such that the focus point of the objective lens on the optical disc is optimally located.

A conventional focus bias adjustment method detects an error rate of playback data when the optical disc is reproduced, and adjusts the focus bias such that the error rate can be minimized. However, the conventional focus bias adjustment method is inefficient, because a single layer DVD (Digital Versatile Disc) needs about 3 seconds to adjust the focus bias, and a dual layer DVD needs about 6 seconds or more to adjust the focus bias.

Another conventional focus bias adjustment method using the jitter carries out a focusing-on operation, a tracking-on operation and a PLL (Phase-Locked Loop) lock operation, measures the amount of jitter from playback data, and adjusts the focus bias such that the amount of jitter can be minimized. But this conventional focus bias adjustment method using the jitter is also inefficient in that the amount of time for adjusting the focus bias increases.

SUMMARY OF THE INVENTION

Therefore, the present invention has been made in view of the above and other problems. It is an object of the present invention to provide a method and device for adjusting a focus bias in an optical disc apparatus, which can quickly adjust the focus bias of an objective lens for the optical disc on the basis of a level of a tracking error signal detected when the optical disc is reproduced.

In accordance with an aspect of the present invention, the above and other objects can be accomplished by the provision of a method for reproducing an optical disc, comprising the steps of: (a) detecting, for a predetermined period of time, a level of a tracking error signal outputted when the optical disc is driven; and (b) carrying out an operation of adjusting a focus bias of an objective lens arranged within an optical pickup on the basis of the detected level of the tracking error signal; and (c) setting a focus bias adjustment value as an optimum focus bias value at a time when the detected level of the tracking error signal is maximized.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, preferred embodiments of a method for adjusting a focus bias of an optical disc in accordance with the present invention will be described in detail with reference to the annexed drawings.

Figure 1:
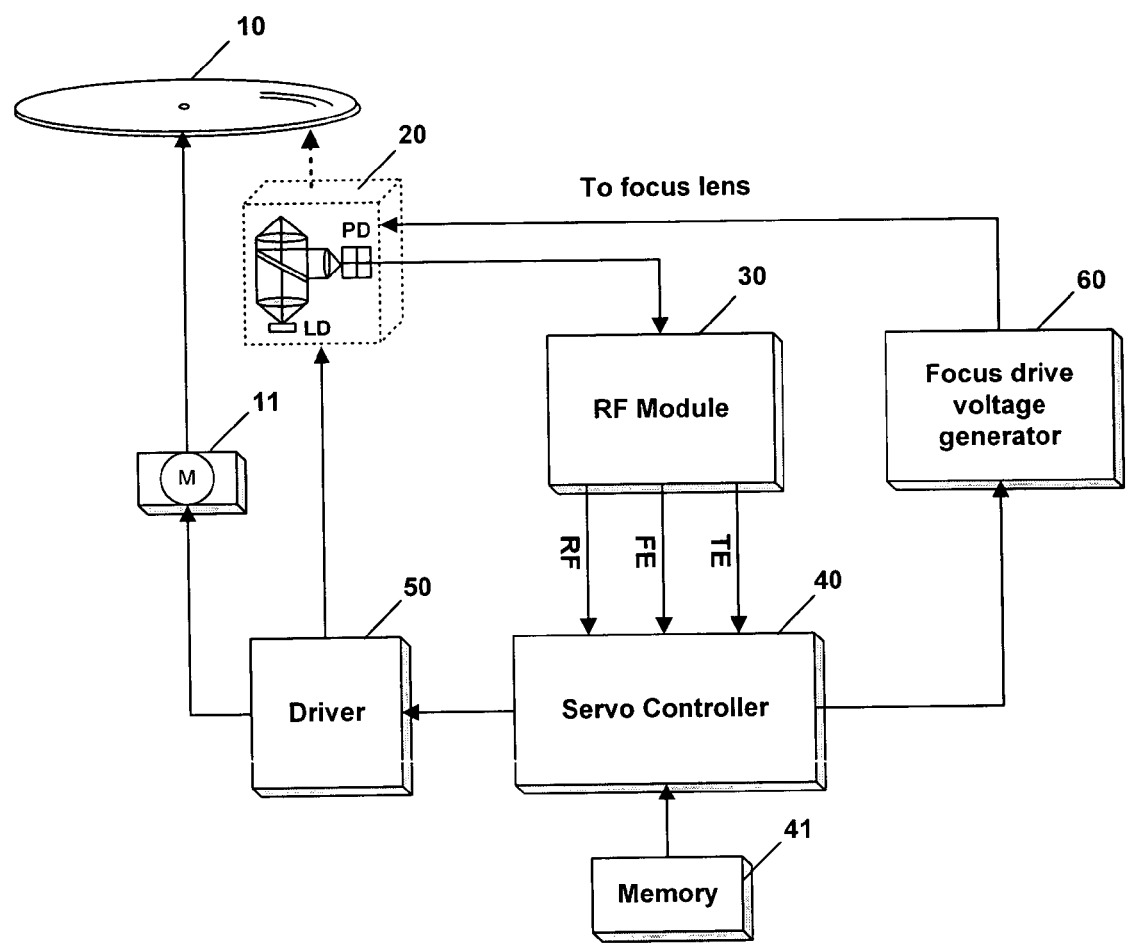
FIG. 1 is a view illustrating the configuration of an optical disc apparatus for implementing a focus bias adjustment method in accordance with an embodiment of the present invention.

FIG. 1 is a view illustrating the configuration of an optical disc apparatus for implementing a focus bias adjustment method in accordance with an embodiment of the present invention. Referring to FIG. 1, the optical disc apparatus includes an optical pickup 20 for reading data recorded on an optical disc 10; an RF (Radio Frequency) module 30 for generating a high-frequency playback signal RF, a focusing error signal FE and a tracking error signal TE from a signal outputted by the optical pickup 20 and outputting the generated signals; a memory 41 for storing a focus bias adjustment value per step to adjust a focus bias; a servo controller 40 for detecting a level of the generated and outputted tracking error signal, and adjusting the focus bias on the basis of the detected level and the stored focus bias (offset) adjustment value; a driver 50 for driving a spindle motor (M) 11 which rotates the optical disc 10 and driving a sled motor which slides the optical pickup 20 back and forth; and a focus drive voltage generator 60 for applying an optimum focus drive voltage to an actuator supporting an objective lens (focus lens) arranged within the optical pickup 20 in response to the focus bias adjustment performed by the servo controller 40. All the components of the optical disc apparatus are operatively coupled.

Figure 2:
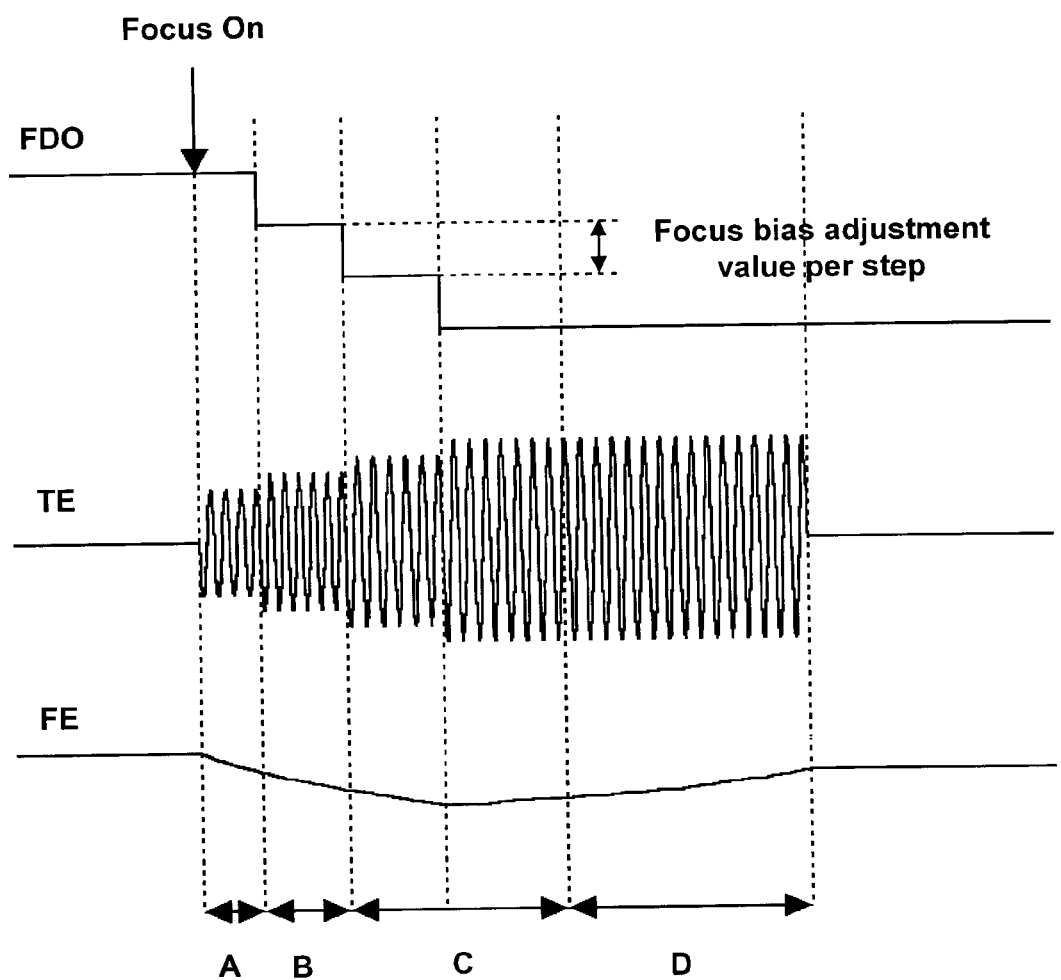
FIG. 2 is a view illustrating an example of waveforms of a focus drive voltage FDO, a tracking error signal TE and a focusing error signal FE according to a focus bias adjustment method of the optical disc apparatus in accordance with the present invention.
Figure 3:
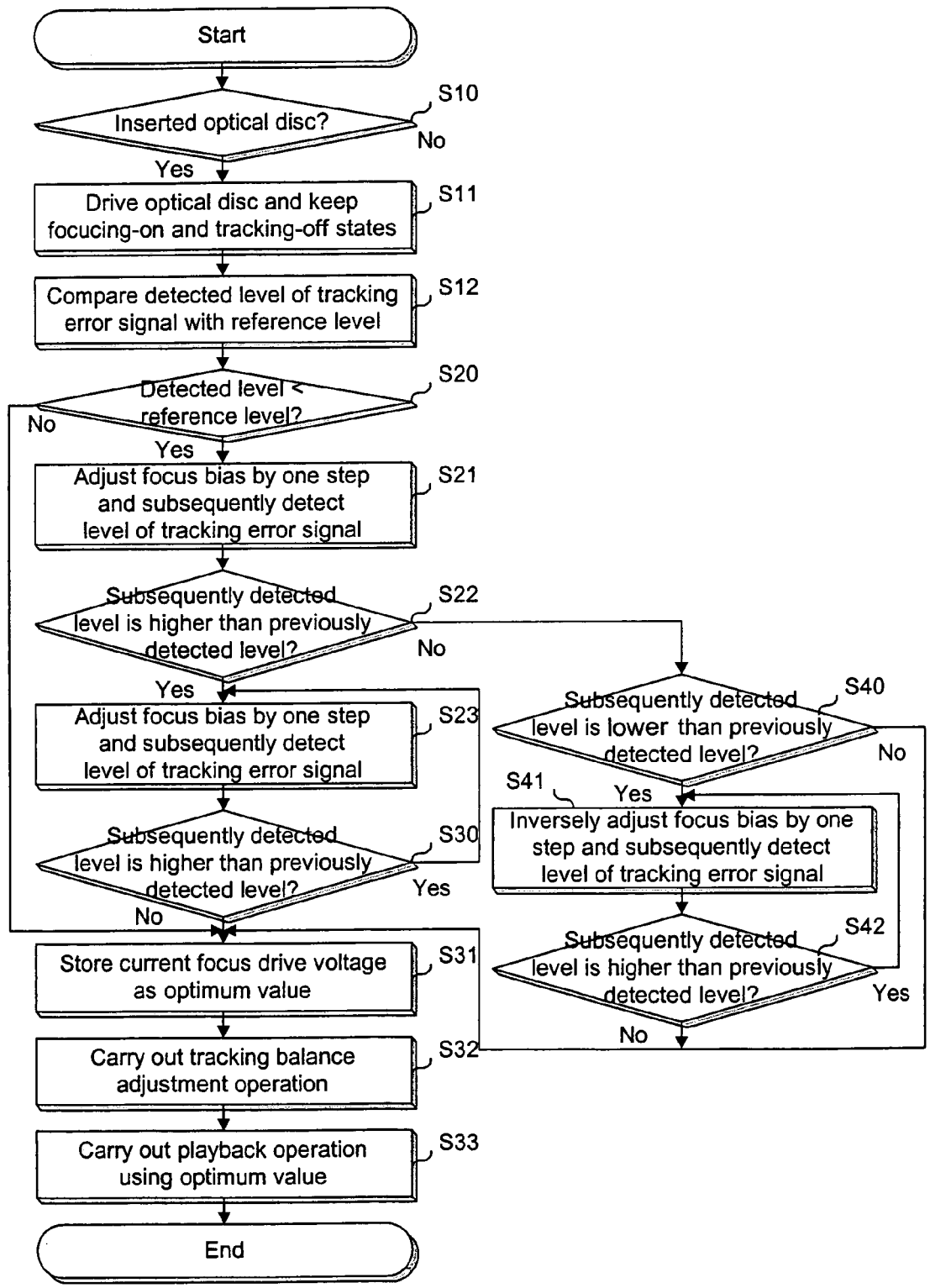
FIG. 3 is a flowchart illustrating the focus bias adjustment method of the optical disc apparatus in accordance with an embodiment of the present invention.

FIG. 2 is a view illustrating waveforms of a focus drive voltage FDO, a tracking error signal TE and a focusing error signal FE according to a focus bias adjustment method of the optical disc apparatus in accordance with the present invention; and FIG. 3 is a flowchart illustrating the focus bias adjustment method of the optical disc apparatus in accordance with the present invention.

The focus bias adjustment method in accordance with the present with FIGS. 1 and 2.

An empirically determined focus bias (offset) adjustment value (e.g., "1") per step is pre-stored in the memory 41 for focus bias adjustment.

If the optical disc 10 is inserted into the optical disc apparatus and rotated at step S10, the servo controller 40 keeps a focusing-on state and a tracking-off state at step S11.

Then, considering the case where the thickness of a substrate of the optical disc 10 is thinner or thicker than the standard thickness (e.g., 0.6 mm in the case of a DVD (Digital Versatile Disc)), the servo controller 40 carries out an operation of adjusting a focus bias to optimize a focus point of the objective lens arranged within the optical pickup 20 for the optical disc 10. To accomplish, the servo controller 40 detects a level of the tracking error signal TE outputted by the RF module 30 for a predetermined period of time (as indicated by "A" shown in FIG. 2), and compares the detected level of the tracking error signal with a predetermined reference level at step S12.

If the detected level of the tracking error signal is lower than the predetermined reference level (as indicated by "B" shown in FIG. 2) as a result of the comparison at step S20, the servo controller 40 determines that a focus point of the objective lens is not optimized, and then carries out an operation of adjusting the focus bias for the objective lens at step S21. That is, the servo controller 40 reads the focus bias adjustment value ("1") per step from the memory 41 and then provides the read focus bias adjustment value to the focus drive voltage generator 60. Thus, the focus drive voltage generator 60 adjusts a focus drive voltage in response to the provided focus bias adjustment value ("1") and then outputs the adjusted focus drive voltage to the objective lens of the pickup 20. For example, if a drive voltage corresponding to the focus bias adjustment value ("1") per step is set as 0.5V, the focus drive generator 60 increases a current drive voltage (e.g., 5V) and then outputs the increased drive voltage (e.g., 5.5V) to the objection lens, such that the focus point of the objective lens is adjusted by one step.

After adjusting the focus bias, the servo controller 40 subsequently detects a level of the tracking error signal at step S21. The servo controller 40 compares the subsequently detected level of the tracking error signal with the previously detected level of the tracking error signal. The servo controller 40 carries out the operation of adjusting the focus bias according to a result of the comparison. That is, if the subsequently detected level of the tracking error signal is higher than the previously detected level of the tracking error signal at step S22, then the servo controller 40 subsequently adjusts the focus bias step by step until the detected level of the tracking error signal increases no further, i.e., until the level of the tracking error signal reaches a maximum level (as indicated by "C" shown in FIG. 2) at step S23.

If the detected level of the tracking error signal increases no further at step S30, the servo controller 40 determines that a current focus point of the objective lens is optimized, and stops the focus bias adjustment operation. The servo controller 40 stores the current focus bias adjustment value (e.g., three steps) and hence the focus drive voltage (e.g., 6.5V) as the optimum value at a time when the level of the tracking error signal is maximized at step S31.

As described above, after the objective lens is moved to an optimum focus point by the servo controller 40, the servo controller 40 carries out a tracking balance adjustment operation such that an optical focus of the optical pickup 20 can be located on a track of the optical disc 10 (as indicated by "D" shown in FIG. 2) at step S32. Then, the servo controller 40 carries out a playback operation for the optical disc 10 in focusing-on and tracking-on states. At this time, the servo controller 40 keeps the focus point of the objective lens for the optical disc 10 in an optimum state using the stored focus bias adjustment value (e.g., three steps) and hence the optimum focus drive voltage (e.g., 6.5V) to carry out the playback operation at step S33.

In the above-described embodiment, if the detected level of the tracking error signal is equal to or higher than the reference level as the result of the comparison at step S20, the servo controller 40 determines that the focus point of the objective lens for the optical disc 10 is optimized, and thus does not carry out the focus bias adjustment operation (i.e., the process moves to step S31). That is, the servo controller 40 outputs a focus bias adjustment value "0" to the focus drive voltage generator 60 such that an output voltage of the focus drive voltage generator 60 is kept as a pre-set drive voltage (e.g., 5V). Simultaneously, the servo controller 40 carries out a tracking balance adjustment operation, keeps the focusing-on and tracking-on states, and carries out a playback operation for the optical disk 10 at steps S31, S32 and S33.

After the focus bias is adjusted for the first time at step S21, the servo controller 40 inversely adjusts the focus bias where the subsequently detected level of the tracking error signal is decreased more than the previously detected level at steps S22 and S40. That is, the servo controller 40 provides a value of "−1" as the focus bias adjustment value per step to the focus drive voltage generator 60. Then, the focus drive voltage generator 60 adjusts the focus drive voltage in response to the focus bias adjustment value "−1", and outputs the adjusted focus drive voltage. For example, if a drive voltage corresponding to the focus bias adjustment value "−1" is set as −0.5V, the focus drive voltage generator 60 decreases a current drive voltage (e.g., 5.5V) and then outputs the decreased drive voltage (e.g., 5V), such that the focus point of the objective lens is inversely adjusted by one step at step S41. After the focus bias is inversely adjusted, a level of the tracking error signal is subsequently detected at step S41.

If the subsequently detected level of the tracking error signal increases more than the previously detected level of the tracking error signal at step S42, the servo controller 40 continuously and inversely adjusts the focus bias step by step until the level of the tracking error signal increases no further. If the detected level of the tracking error signal increases no further, the servo controller 40 determines that the current focus point of the objective lens is optimized, and then terminates the focus bias adjustment operation. Then, the servo controller 40 stores the current focus bias adjustment value and hence the focus drive voltage as the optimum value at stop S31 as discussed above. Step S32 is also performed. After the tracking balance adjustment operation is carried out at step S32 as described above, the playback operation for the optical disc 10 is carried out using the current focus bias adjustment value and hence the focus drive voltage at S33 as discussed above.

Figure 4:
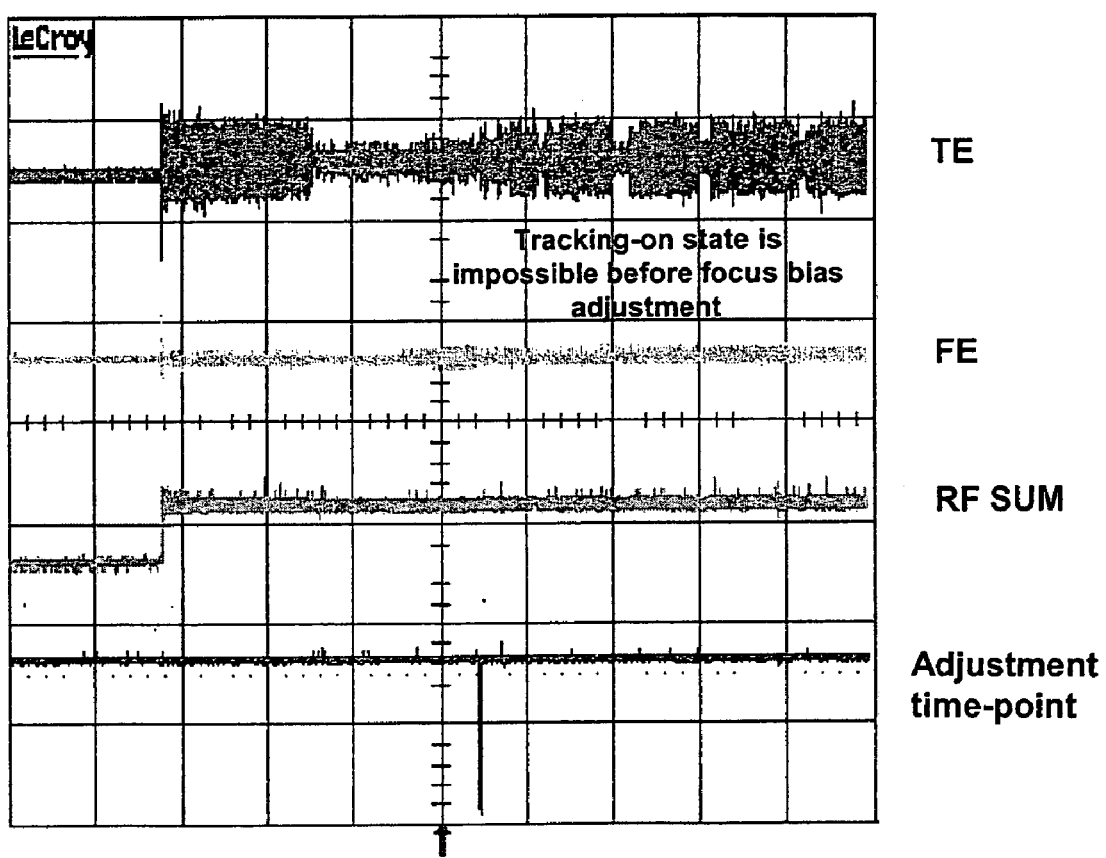
FIGS. 4 and 5 are views illustrating examples of waveforms of signals TE, FE and RFSUM before and after the focus bias adjustment, respectively, in accordance with the present invention.
Figure 5:
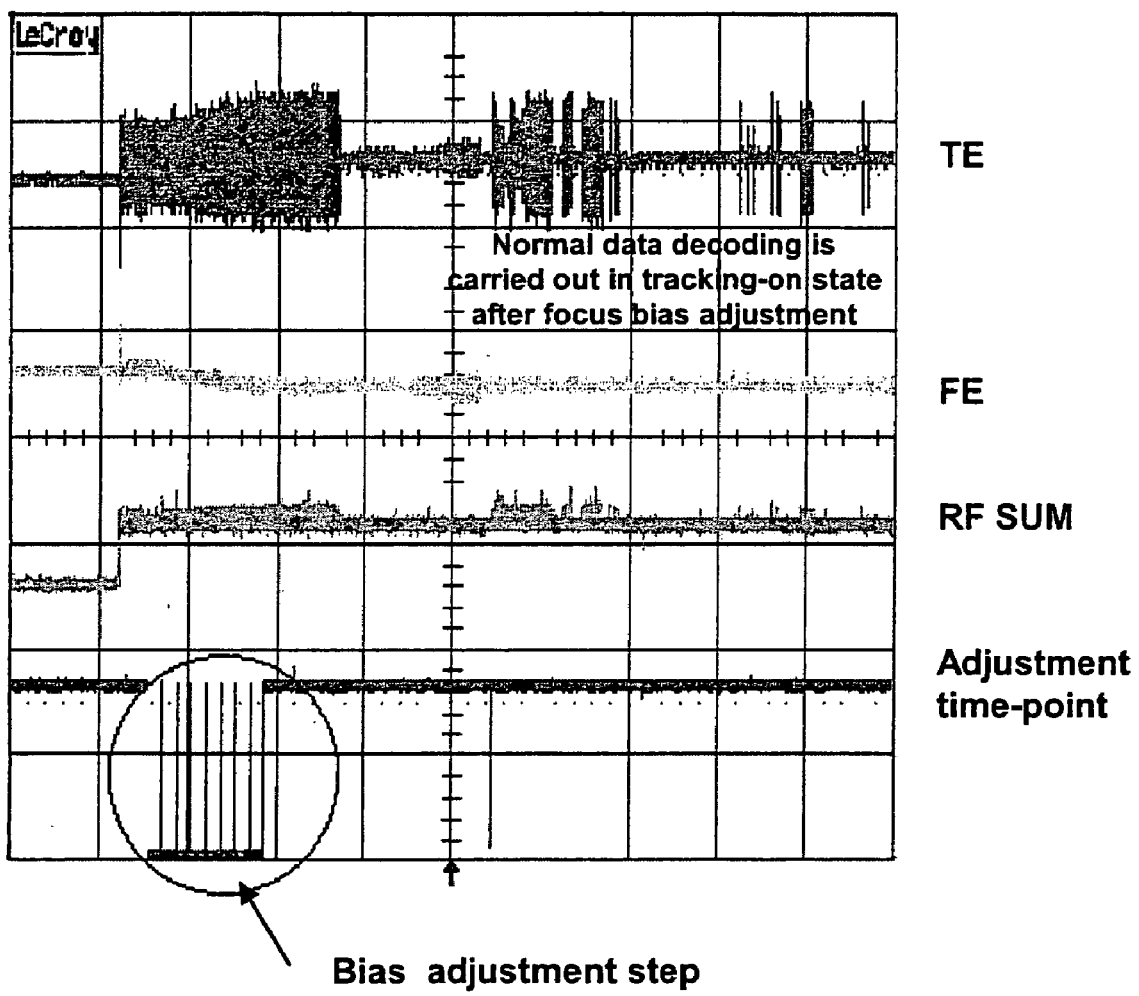

FIGS. 4 and 5 are views illustrating respectively certain examples of waveforms of signals TE, FE and RF SUM before and after the focus bias adjustment in accordance with the present invention. As shown in FIG. 4, where the tracking operation is in an OFF state before the focus bias of the objective lens is adjusted, a normal playback operation for the optical disc 10 is not accomplished. As shown in FIG. 5, where the tracking operation is in an ON state after the focus bias of the objective lens is adjusted in accordance with the present invention, a normal playback operation for the optical disc 10 is accomplished.

As apparent from the above description, the present invention provides a method for adjusting a focus bias of an optical disc, in which a period of time for adjusting the focus bias is very short, e.g., on the order of "0" to several hundred milliseconds, in comparison with periods of time for adjusting the focus bias in conventional methods. Moreover, the method in accordance with the present invention moves the objective lens to an optimum focus point where the thickness of a substrate in the optical disc is thinner or thicker than the standard thickness (e.g., 0.6 mm in the case of a DVD), thereby enabling a normal playback operation on optical discs of varying thickness.

Those skilled in the art will appreciate that various modifications, additions and substitutions are possible, without departing from the scope and spirit of the invention as disclosed in the accompanying claims.

What is claimed is:

1. A method for reproducing an optical disc, comprising the steps of:
   a) detecting, for a predetermined period of time, a level of a tracking error signal outputted when the optical disc is driven;
   b) comparing the level of the detected tracking error signal with a predetermined reference level;
   c) setting that a current focus point of an objective lens for the optical disc is optimized without adjusting a focus bias of the objective lens, if the comparing step (b) indicates that the level of the detected tracking error signal is not lower than the predetermined reference level;
   d) carrying out an operation of adjusting the focus bias of the objective lens arranged within an optical pickup on the basis of the detected level of the tracking error signal, if the comparing step (b) indicates that the level of the detected tracking error signal is lower than the predetermined reference level; and
   e) setting a focus bias adjustment value as an optimum focus bias value at a time when the detected level of the tracking error signal is maximized after performing the step (d).

2. The method as set forth in claim 1, wherein the step (a) is carried out in a focusing-on state and a tracking-off state.

3. The method as set forth in claim 1, wherein in the step (e), the focus bias adjustment value is set as "0", if the level of the tracking error signal detected at the step (a) is higher than the predetermined reference level.

4. The method as set forth in claim 1, wherein the step (d) comprises the step of:
   if the detected level of the tracking error signal is lower than the level of the tracking error signal detected before the operation of adjusting the focus bias, carrying out an operation of inversely adjusting the focus bias until the detected level of the tracking error signal does not increase further.

5. The method as set forth in claim 1, further comprising the step of:
   f) if the operation of adjusting the focus bias is completed, carrying out a playback operation in a focusing-on state and a tracking-on state on the basis of the set focus bias adjustment value.

6. The method as set forth in claim 5, wherein the step (f) further comprises the step of:
   if the operation of adjusting the focus bias is completed, carrying out a tracking balance adjustment operation.

7. The method as set forth in claim 1, wherein the operation of adjusting the focus bias at the step (d) is carried out on the basis of the focus bias adjustment value per step stored in a memory.

8. The method as set forth in claim 1, further comprising the step of:
   (g) storing, in a memory, the set focus bias adjustment value as the optimum focus bias value.

9. The method as set forth in claim 1, wherein the step (d) comprises the step of:
   if the detected level of the tracking error signal is lower than the predetermined reference level, increasing a current focus drive voltage incrementally per step until the level of the tracking error signal reaches a maximum level.

10. The method as set forth in claim 9, wherein the maximum level is reached when the level of the tracking error signal does not increase further.

11. A device for reproducing an optical disc, comprising:
    means for detecting, for a predetermined period of time, a level of a tracking error signal outputted when the optical disc is driven;
    means for comparing the level of the detected tracking error signal with a predetermined reference level;
    means for setting that a current focus point of an objective lens for the optical disc is optimized without adjusting a focus bias of the objective lens, if the comparing means indicates that the level of the detected tracking error signal is not lower than the predetermined reference level;
    means for carrying out an operation of adjusting the focus bias of the objective lens arranged within an optical pickup on the basis of the detected level of the tracking error signal, if the comparing means indicates that the level of the detected tracking error signal is lower than the predetermined reference level; and
    means for setting a focus bias adjustment value as an optimum focus bias value at a time when the detected level of the tracking error signal is maximized after the carrying means carries out the operation of adjusting the focus bias.

12. The device as set forth in claim 11, wherein the means for detecting the level of the tracking error signal carries out the detecting in a focusing-on state and a tracking-off state.

13. The device as set forth in claim 11, wherein the focus bias adjustment value is set as "0", if the level of the tracking error signal detected is higher than the predetermined reference level.

14. The device as set forth in claim 11, wherein if the detected level of the tracking error signal is lower than the level of the tracking error signal detected before the operation of adjusting the focus bias, the means for carrying out the operation of adjusting the focus bias of the objective lens carries out an operation of inversely adjusting the focus bias until the detected level of the tracking error signal does not increase further.

15. The device as set forth in claim 11, further comprising:
    if the operation of adjusting the focus bias is completed, fourth means for carrying out a playback operation in a focusing-on state and a tracking-on state on the basis of the set focus bias adjustment value.

16. The device as set forth in claim 15, wherein if the operation of adjusting the focus bias is completed, the fourth means carries out a tracking balance adjustment operation.

17. The device as set forth in claim 11, wherein the means for carrying out the operation of adjusting the focus bias of the objective lens carries out the operation of adjusting the focus bias on the basis of the focus bias adjustment value per step stored in a memory.

18. The device as set forth in claim 11, further comprising:
   a memory to store therein the set focus bias adjustment value as the optimum focus bias value.

19. The device as set forth in claim 11, wherein if the detected level of the tracking error signal is lower than the predetermined reference level, the means for carrying out the operation of adjusting the focus bias of the objective lens increases a current focus drive voltage incrementally per step until the level of the tracking error signal reaches a maximum level.

20. The device as set forth in claim 19, wherein the maximum level is reached when the level of the tracking error signal does not increase further.

* * * * *